S. W. Putnam Jr,
Shaping Metals.
No. 112,737. Patented Mar. 14, 1871.
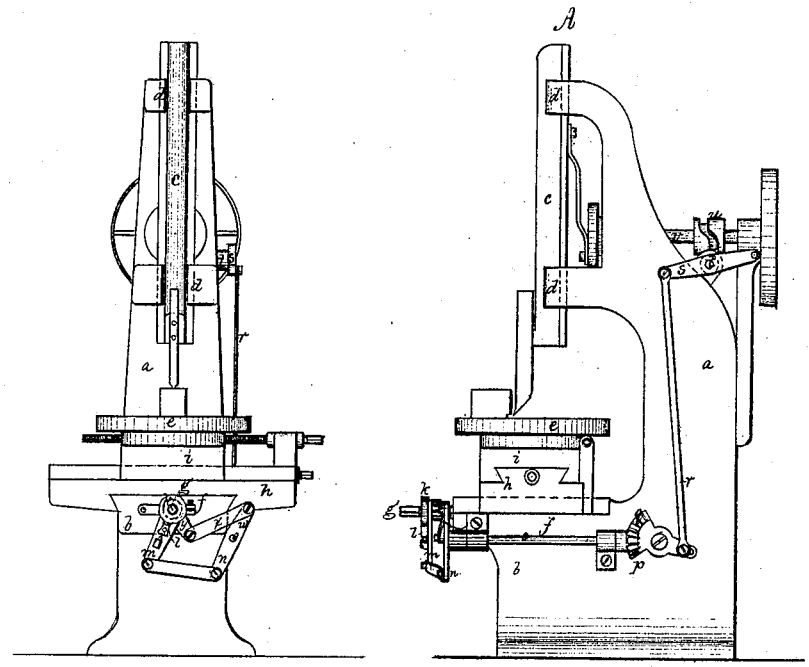
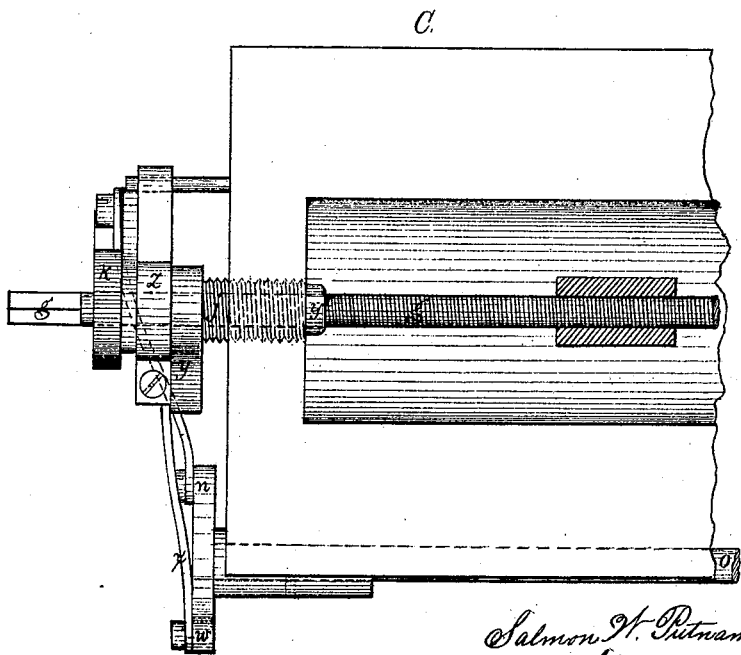
Witnesses: J. B. Kidder, C. Warren Brown
Salmon W. Putnam Jr.
By his Atty's
Crosby, Halsted & Gould

United States Patent Office.

SALMON W. PUTNAM, JR., OF FITCHBURG, MASSACHUSETTS.

Letters Patent No. 112,737, dated March 14, 1871.

IMPROVEMENT IN MACHINES FOR SLOTTING AND CUTTING METAL.

The Schedule referred to in these Letters Patent and making part of the same.

*To all whom it may concern:*

Be it known that I, SALMON W. PUTNAM, Jr., of Fitchburg, in the county of Worcester and State of Massachusetts, have invented an Improvement in Metal-cutting Machines; and I do hereby declare that the following, taken in connection with the drawing which accompanies and forms part of this specification, is a description of my invention sufficient to enable those skilled in the art to practice it.

My invention relates to one of the details of construction or organization of machines for working metal, being particularly applicable to slotting-machines.

In all such machines as heretofore made the cutting-point or edge of the tool and the face cut by the tool in its descent or forward movement have remained in the same plane during the rise or retreat of the tool, and the back-drag of the tool-edge against the metal sometimes breaks the edge of the tool, always tends to dull such edge, sometimes mars the work, and always causes friction of the tool against the work.

The object of my invention is to so organize the mechanism as to avoid the contact of the work and tool in the ascent or retreat of the tool; and The invention consists in a metal-working machine, having, in combination, a work-supporting table; mechanism to impart feed-movements to said table; a reciprocating cutter; and mechanism to impart to the work-supporting table slight reciprocal movements, to remove the work away from the cutter after every forward thrust thereof, and before it commences to retreat, and back again to the cutter after every backward movement thereof, and before it is again thrust forward.

The drawing represents at A and B (respectively) side and front elevations of a slotting-machine embodying my improvement, or of so much of the machine as will enable the improvement to be clearly understood.

C shows, in plan, (enlarged,) the mechanism with which the invention is immediately connected.

$a$ denotes the upright frame of the machine, and $b$, the sole or bed.

$c$ is the tool-stock or ram, sliding vertically in guideways $d$, and having its reciprocating vertical movements imparted in the usual manner.

$e$ is the work-supporting table, to which transverse feed-movement, longitudinal feed-movement, or rotative feed-movement may be imparted in the usual manner, and according to the character of the work to be effected.

Through the bed $f$ runs the feed-screw $g$, by which forward or backward movement is imparted to the longitudinal slide $h$, upon which rests and slides the transverse slide $i$, that supports the work-plate or table $e$, the slide $h$ having a nut-threaded projection, in which the feed-screw plays.

At the front end of the feed-screw $g$ is a ratchet-wheel, $k$, fast on the shaft, and with the teeth of this ratchet engages a reversible pawl, $l$, which may be set to drive the wheel in either direction, or may be so set that it will not engage with the wheel.

This pawl is jointed to a pawl-arm, $m$, which is jointed to the lower end of a rocker-arm, $n$, fixed on the outer end of a rocker-shaft, $o$.

At the opposite end of this shaft is a bevel-wheel, $p$, worked by a segment-gear, $q$, which is connected, by a link, $r$, with a rocker-lever, $s$, on a rocker-shaft, $t$, carrying an arm, from which projects a pin that enters the cam-groove of a cam-cylinder, $u$, on the driving-shaft $v$.

Opposite to the rocker-arm $n$ is another arm, $w$, connected, by a link, $x$, to an arm, $y$, projecting from the end of a screw-threaded sleeve, $j$.

The feed-screw $g$ runs through this sleeve, (which is nut-threaded,) and the sleeve-screw works through a nut-thread in the bed $f$, the inner end working against a collar, $y^2$, fast on the feed-screw, while its outer end works against a collar or clamp, $z$.

After the forward or feed-movement of the cutting-tool takes place, and just before the rise or retreat of the tool, the action of the cam draws back the link $x$ and turns the sleeve $j$, moving it outward, the sleeve acting against the clamp and forcing the feed-screw outward, and, with it, the work-supporting table, carrying the face of the work back from the path of movement of the tool-edge, so that as the tool rises or retreats it runs free from the work.

Before the tool next descends or moves forward, the movement of the link $x$ is reversed and the feed-screw is carried to its former position, except so far as such position may have been modified by the simultaneous movement of the feed mechanism, for the next action of the cutting-tool.

It will be obvious that the result of the back-action mechanism will be the same in whichever direction the work is being fed, whether forward or backward, or transversely or rotatively, the work always being started back just after the cutting-movement of the tool, and so that while the tool itself moves backward in exactly the plane in which it moved forward, the face cut by it has been removed sufficiently far for the tool to escape it.

I claim as my improvement in machines for slotting or cutting metal—

The combination of a work-supporting table, mechanism to impart feed-movements to said table, a reciprocating cutter, and mechanism to impart to the work-supporting table slight reciprocal movements to remove the work away from the cutter after every forward thrust thereof, and before it commences to retreat, and back again to the cutter after every backward movement thereof, and before it is again thrust forward, substantially as and for the purpose herein described.

SALMON W. PUTNAM, Jr.

Witnesses:
FRANCIS GOULD,
M. W. FROTHINGHAM.